United States Patent Office 3,557,153
Patented Jan. 19, 1971

3,557,153
N-ACYLATED BENZENE-2,4-DISULFONAMIDES
AND PROCESS FOR PREPARING THEM
Karl Sturm, Frankfurt am Main, and Walter Siedel, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed June 27, 1967, Ser. No. 649,126
Claims priority, application Germany, July 13, 1966, F 49,679
Int. Cl. C07c 143/82; C07d 5/64
U.S. Cl. 260—347.2                7 Claims

ABSTRACT OF THE DISCLOSURE

N-acylated halobenzene-2,4-disulfonamide of the formula

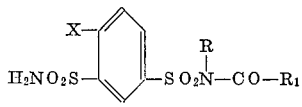

in which X is chlorine or bromine; R is methyl, ethyl or tetrahydrofurfuryl; and $R_1$ is alkyl of up to 8 carbon atoms, chloromethyl, bromomethyl, allyl, furyl, cyclopentylmethyl, phenyl, benzyl or phenylethyl, have been found to have valuable diuretic and saluretic activity.

---

The present invention provides N-acylated benzene-2,4-disulfonamides having diuretic and saluretic action and a process for preparing them.

More particularly, the present invention provides N-acylated halogenobenzene-2,4-disulfonamides of the general Formula I

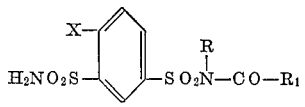    (I)

in which X represents a chlorine or bromine atom, R represents a low molecular weight alkyl, alkoxyalkyl or tetrahydrofurfuryl radical, and $R_1$ represents an alkyl cycloalkyl or cycloalkylalkyl radical which may be substituted by halogen atoms or be singly unsaturated and which may contain up to 8 carbon atoms, furthermore a phenyl, furyl, thenyl, phenylalkyl, furylalkyl or thenylalkyl radical may be substituted in the phenyl radical by halogen atoms, alkyl or alkoxy groups, and in which the alkylene bridge of the phenylalkyl, furylalkyl or thenylalkyl radical may be branched and/or singly unsaturated.

The present invention also provides a process for preparing the above-identified compounds of the general Formula I, which process comprises reacting sulfohalides of the general Formula II

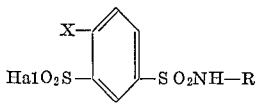    (II)

in which X has the meaning given above and Hal represents a halogen atom, preferably a chlorine atom, with a reactive derivative of a carboxylic acid of the general Formula III $$R_1\text{—COOH} \qquad (III)$$

and treating with ammonia the sulfohalides of the general Formula IV

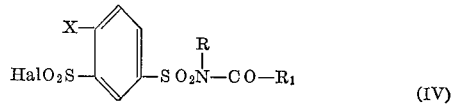    (IV)

thus obtained.

The preparation of the starting substances of the general Formula II, in which R represents a low molecular weight alkyl radical, is known from German Pat. 1,126,-862. The other compounds of the general Formula II can be prepared in a manner analogous to that of the known process.

As important starting substances, there may be mentioned, for example, chlorobenzene - 2,4 - disulfonic acid chloride - (2)-methylamide - (4), bromobenzene - 2,4-disulfonic acid chloride - (2)-methylamide - (4), chlorobenzene - 2,4-disulfonic acid chloride - (2)-ethylamide-(4), chlorobenzene - 2,4-disulfonic acid chloride - (2)-isopropylamide-(4) and chlorobenzene - 2,4-disulfonic acid chloride - (2)-[2-ethoxy-ethylamide]-(4).

According to the process of the invention the starting compounds of the general Formula II are reacted in the first stage with reactive derivatives, preferably the symmetrical anhydrides and halides, of carboxylic acids of the general Formula III.

Suitable carboxylic acids are, for example, aliphatic carboxylic acids such as acetic acid, propionic acid, n-butyric acid, isobutyric acid, α-methyl-n-butyric acid, diethylacetic acid, tert. butylacetic acid, n-valeric acid, iso-valeric acid, β-methyl-n-valeric acid, n-caproic acid, isocaproic acid, n-caprylic acid, chloroacetic acid, bromoacetic acid, α-bromobutyric acid, α- and β-chloropropionic acid, acrylic acid, crotonic acid, isocrotonic acid, vinylacetic acid, β-chlorocrotonic acid, hexene-(2)-carboxylic acid, octene-(2)-carboxylic acid, cyclo-aliphatic carboxylic acids such as cyclopentane-carboxylic acid, hexahydrobenzoic acid, cyclopentyl-acetic acid, cyclopentenyl-acetic acid, cyclohexyl-acetic acid, as well as heterocyclic or aromatic carboxylic acids such as thiophene-2-carboxylic acid, furane-2-carboxylic acid, β-[furyl-(2)]-acrylic acid, the isomeric chlorobenzoic acids, 2,4-dichlorobenzoic acid, the isomeric methoxybenzoic acids, veratric acid, piperonylic acid, trimethoxybenzoic acid, the isomeric toluic acids, phenyl-acetic acid, α-phenyl-propionic acid, γ-phenyl-valeric acid, cinnamic acid and hydrocinnamic acid.

The reaction of the sulfohalides of the general Formula II with the symmetrical acid anhydrides or acid halides, preferably the chlorides, is advantageously effected without solvent at temperatures in the range of from 40 to 120° C., using 2 to 10 molar equivalents of the carboxylic acid derivative concerned. If carboxylic acid halides are used, it is necessary to add at least 1 molar equivalent of an agent binding the hydrohalic acid set free. It is of special advantage to use for this purpose, 1–2 molar equivalents of dry and finely pulverized sodium or potassium formate.

While there are no significant differences with regard to the reaction temperature to be used in the case of halides and anhydrides of the same carboxylic acid, aromatic carboxylic acid anhydrides and halides require higher reaction temperatures than the corresponding araliphatic and aliphatic carboxylic acid derivatives. In order to obtain a complete reaction, it is advantageous to use reaction temperatures in the range of from 90 to 110° C. in the case of aromatic carboxylic acid derivatives and temperatures in the range of from 70 to 90° C. in the case of araliphatic and aliphatic carboxylic acid derivatives. Mixed anhydrides of formic acid and of an acid of the general formula $R_1$—COOH react likewise under introduction of the radical $R_1$—CO.

For isolating the acyl derivatives of the general Formula IV that have formed, the excess of carboxylic acid halide or the excess of carboxylic acid anhydride and the carboxylic acid formed during the reaction are removed by distillation under reduced pressure at a maximum bath temperature of 100 to 110° C. Since the anhydrides of higher molecular weight carboxylic acids of the general Formula III are no longer distillable at this temperature and under a vacuum of 0.1 mm. Hg, it is especially advantageous to use the corresponding acid chlorides for the introduction of higher acyl radicals. On the other hand, it is also possible, especially if the reactive carboxylic acid derivative is easily accessible and has been used in a relatively small excess, to omit concentration and to remove the carboxylic acid derivative by digestion with petrol ether, cyclohexane, benzene, ether or mixtures of these solvents. The crude acylated sulfochlorides of the general Formula IV can be purified in simple manner by recrystallization from ethyl acetate or from a mixture of ethyl acetate and petrol ether, whereby the sodium chloride and sodium formate which may be present are also removed.

In the second stage, the acylated sulfohalides of the general Formula IV are reacted with ammonia. This condensation is advantageously carried out in inert, water-miscible solvents such, for example as ethanol, tetrahydrofurane, dioxane, dimethylformamide or acetonitrile, at temperatures in the range of from 0 to 20° C. The ammonia may be used in a small excess.

According to a particularly advantageous method of operation, the sulfohalide is dissolved, for example, in 5 to 10 times the quantity by weight of tetrahydrofurane and to this solution, there is added dropwise, at +10° C., such an amount of a concentrated aqueous ammonia solution that the mixture shows a distinct alkaline reaction in a test with wet indicator paper, and directly thereafter the fulfonamide that has formed is precipitated by the addition of dilute acetic acid. In general, the products of the general Formula I precipitate directly in crystalline form and they can be easily purified by recrystallization from ethanol, a mixture of ethanol and water or a mixture of ethyl acetate and petrol ether.

The products of the present invention are valuable medicaments that have excellent diuretic and saluretic action. They are distinguished over the known, not acylated compounds of this type by a rapidly onsetting, intense and long-lasting diuretic and sodio-uretic action component and a relatively low potassium excretion. With a $LD_{50}$ of more than 5 g./kg. upon oral administration in the rat, the tolerance is very good. In human therapy, they are preferably administered orally in the form of tablets, capsules and dragées which contain the active substance in a quantity of 50 to 500 mg. The products of the present invention are preferably used for the therapy of edemas of any genesis and of essential hypertonia.

The superior activity of the products of the present invention over the known products is evident from the following table in which the diuretic and saluretic test results of the known 1-chloro-$N^4$-methyl-benzene-2,4-disulfonamide (Compound "I") are compared with those of the new products of the invention, i.e. 1-chloro-$N^4$-methyl-$N^4$-acetyl-benzene-2,4-disulfonamide (Compound "II") (cf. Example 1) and 1-chloro-$N^4$-methyl-$N^4$-butyryl-benzene-2,4-disulfonamide (Compound "III") (cf. Example 4).

TABLE I

| Compound: | Lipschitz factor T/U (50 mg./kg.) | $[Na]^\oplus$ (mmol./kg./ 5 hours) | $[K]^\oplus$ (mmol./kg./ 5 hours) | $\dfrac{[Na]^\oplus}{[K]^\oplus}$ |
|---|---|---|---|---|
| I | 1.4 | 4.6 | 3.6 | 1.3 |
| II | 3.6 | 6.0 | 1.6 | 3.8 |
| III | 3.0 | 5.6 | 1.6 | 3.5 |

With regard to the above table, the following explanations are given:

The Lipschitz factor, which serves as a measure for the diuretic activity of a preparation, was determined in animal tests, for example, in the following manner: two groups each of six rats were deprived of drinking water for 24 hours. Each rat of the first group was then administered 1 g./kg. of urea and each rat of the second group was given 50 mg./kg. of the compound to be tested. Each rat was then given 5 cc./100 g. of a physiological sodium chloride solution. The quantity of urine of the animals treated was determined hourly and the 5-hour value was converted into a value corresponding to 100 g. of body weight of the rats treated. The Lipschitz-factor was the quotient of the quantity of urine, obtained after administration of urea, in the denominator, and the quantity of urine, obtained after administration of the preparation to be tested, in the numerator. The higher this factor, the better was the diuretic activity of the compound tested.

The values $[Na]^\oplus$ and $[K]^\oplus$ are a measure for the saluretic activity of a compound. These values were determined in the following manner: as test animals, rats were used which had been deprived of food for 24 hours but had received drinking water ad libitum. The determination of the Lipschitz-factor and in the urine collected after 5 hours the concentration of sodium and potassium ions was determined flame-photometrically.

The higher the excretion of sodium and the lower the excretion of potassium, i.e., the higher the quotient $[Na]^\oplus/[K]^\oplus$ is, the better is the activity of a compound.

The following examples illustrate the invention.

EXAMPLE 1

1-chloro-$N^4$-methyl-$N^4$-acetyl-benzene-2,4-disulfonamide (a) 30.4 of 1 - chloro - N - methyl - benzene - 2 - sulfochloride - 4 - sulfonamide (melting point 124° C., from ethyl acetate) (0.1 mol) were heated for 1 hour to 80° C. with 66 cc. of acetanhydride. The weakly yellow reaction solution was then evaporated under reduced pressure on a steam bath, the residue was taken up in 150 ml. of boiling ethyl acetate and the same volume of petrol ether was added in the heat. Crystallization of the 1 - chloro - N - methyl - N - acetyl - benzene - 2 -sulfochloride - 4 - sulfonamide started immediately. After cooling for 1 hour in ice water, the product was filtered off with suction, washed with petrol ether and dried at 60° C. Yield: 28.5 g. (82% of the theory); melting point: 141–142° C.

(b) To the solution of 17.3 g. of the above-mentioned sulfochloride (0.05 mol) in 150 ml. of tetrahydrofurane, there was added dropwise, at 15–20° C., while stirring, an aqueous ammonia solution having a strength of 20%, until the mixture showed a weakly alkaline reaction. The mixture was then weakly acidified by means of acetic acid, about ⅔ of the tetrahydrofurane were eliminated under slightly reduced pressure and the concentrated product was combined with 0.3 l. of $H_2O$. The sulfonamide that had formed crystallized completely within 1 hour at 0° C. Crude yield: 13 g. (80% of the theory); melting point: 198–199° C. After recrystallization from ethanol, small needles melting at 200° C. were obtained.

EXAMPLE 2

1-chloro-$N^4$-methyl-$N^4$-chloroacetyl-benzene-2,4-disulfonamide (a) 30.4 g. of 1 - chloro - N - methyl - benzene - 2- sulfochloride - 4 - sulfonamide (0.1 mol) and 34.0 g. of chloroacetic acid anhydride (0.2 mol) were heated 1 hour to 110° C. The reaction mixture was well triturated with 0.5 l. of water, the condensation product which had remained undissolved after standing for 1 hour at room temperature was filtered off with suction and dried on the air. Crude yield of 1 - chloro - N - methyl - N - chloroacetyl - benzene - 2 - sulfochloride - 4 - sulfonamide: 33.5 g. (88% of the theory); melting point: 115–130° C. After recrystallization from ethyl acetate, 22.8 g. of colourless prisms melting at 148° C. were obtained.

(b) 19.1 g. of the sulfochloride (0.05 mol) were reacted with ammonia in 100 ml. of tetrahydrofurane in a manner analogous to that described in Example 1(b) and the crude sulfonamide was purified by crystallization from ethanol. Yield: 10.0 g. (55% of the theory), melting point: 173–174° C.

EXAMPLE 3

1-chloro-$N^4$-methyl-$N^4$-propionyl-benzene-2,4-disulfonamide

The reaction, in a manner analogous to that described in Example 1(a), with 60 ml. of propionic acid anhydride instead of acetanhydride yielded in the first stage 27.0 g. of 1 - chloro - N - methyl - N - propionyl-benzene - 2- sulfochloride - 4 - sulfonamide (75%), melting at 119° C. 18.0 g. (0.05 mol) of this product were then reacted with ammonia in a manner analogous to that described in Example 1 (b). After recrystallization from ethanol having a strength of 50%, the yield was 10.2 g. (60% of the theory); melting point 172–173° C.

EXAMPLE 4

1-chloro-$N^4$-methyl-$N^4$-butyryl-benzene-2,4-disulfonamide

The reaction, in a manner analogous to that described in Example 1(a), with 60 ml. of butyric acid anhydride instead of acetanhydride yielded in the first stage 29.2 g. of 1-chloro-N-methyl-N-butyryl-benzene-2-sulfochloride-4-sulfonamide (78% of the theory), melting at 110–111° C. 18.7 g. (0.05 mol) of this product were reacted with ammonia in a manner analogous to that described in Example 1(b). Yield: 10.3 g. (58% of the theory); melting point: 168–169° C. (from ethanol having a strength of 50%.

EXAMPLE 5

1-chloro-$N^4$-ethyl-$N^4$-acetyl-benzene-2,4-disulfonamide 31.8 g. of 1 - chloro - N - ethyl - benzene - 2 - sulfochloride - 4 - sulfonamide (melting point 104° C., from a mixture of benzene and petrol ether) (0.1 mol) were reacted with acetanhydride in a manner analogous to that described in Example 1(a) and the crude product was recrystallized from a mixture of ethyl acetate and petrol ether. Yield: 30.0 g. (83% of the theory); melting point: 114–115° C. From 18.0 g. (0.05 mol) of this 1 - chloro - N - ethyl - N - acetyl - benzene - 2 - sulfochloride - 4 - sulfonamide, there were obtained by the reaction with ammonia in a manner analogous to that described in Example 1(b), 13.1 g. (77% of the theory) of the corresponding sulfonamide. Melting point: 195–196° C. (from ethanol having a strength of 50%).

EXAMPLE 6

1-chloro-$N^4$-methyl-$N^4$-crotonyl-benzene-2,4-disulfonamide

The reaction, in a manner analogous to that described in Example 1(a), with 60 ml. of crotonic acid anhydride instead of acetanhydride yielded in the first stage 23.3 g. (62% of the theory) of 1 - chloro - N - methyl - N - crotonyl - benzene - 2-sulfochloride - 4 - sulfonamide. By the reaction of 18.6 g. (0.05 mol) of the sulfochloride with ammonia in a manner analogous to that described in Example 1(b), there were obtained, after recrystallization from 50% ethanol, 12.5 g. (71% of the theory) of the corresponding amide. Melting point: 162–163° C.

EXAMPLE 7

1-chloro-$N^4$-methyl-$N^4$-(2-furoyl)-benzene-2,4-disulfonamide (a) 30.4 g. of 1 - chloro - N - methyl - benzene - 2 - sulfochloride - 4 - sulfonamide (0.1 mol), 65 g. of furane-(2) - carboxylic acid chloride (0.5 mol), and 10.2 g. of finely pulverized sodium formate (0.15 mol) were heated for 1 hour to 90° C., while stirring. The excess of carboxylic acid chloride was then removed under reduced pressure and the brownish residue obtained after evaporation was shaken at room temperature with 0.5 l. of water until it crystallized. The air-dry crude product (32 g., melting point 80–90° C.) crystallized from a mixture of ethyl acetate and petrol ether (about 1:5), with addition of charcoal, in the form of colourless prisms. Yield: 22.5 g. (56% of the theory); melting point: 99–100° C.

(b) 19.9 g. of the sulfochloride (0.05 mol) were dissolved in 100 ml. of tetrahydrofurane and to this solution, there was added dropwise, in the course of 10 minutes, at +5° C., while stirring, 20 ml. of 5 N aqueous ammonia. The while was rendered weakly acidic by means of acetic acid, concentrated to half its volume, combined with 0.3 l. of water and allowed to crystallize overnight at 0° C. The crude amide (13.5 g., melting point 186–188° C.) crystallized from ethanol in the form of weakly yellowish, small needles. Yield: 10.2 g. (54% of the theory); melting point: 195° C.

EXAMPLE 8

1-chloro-$N^4$-methyl-$N^4$-benzoyl-benzene-2,4-disulfonamide (a) The mixture of 30.4 g. of 1-chloro-N-methyl-benzene-2-sulfochloride-N-sulfonamide (0.1 mol) and 56.5 g. of benzoic acid anhydride (0.25 mol) was heated for 1 hour to 100° C. The reaction mixture, which crystallized upon cooling, was triturated with 0.2 l. of ether, the condensation product that had remained undissolved was separated and the product was recrystallized from ethyl acetate. Yield: 34.8 g. of colourless small needles (85% of the theory); melting point: 172–173° C.

(b) 20.5 g. of the intermediate product (0.05 mol) yielded, upon reaction with ammonia in a manner analogous to that described in Example 1(b), 15.2 g. of disulfonamide (78% of the theory). Melting point: 227° C. (from a mixture of ethanol and dimethylformamide).

EXAMPLE 9

1-chloro-$N^4$-methyl-$N^4$-cyclopentylacetyl-benzene-2,4-disulfonamide (a) 30.4 g. of 1-chloro-N-methyl-benzene-2-sulfochloride-4-sulfonamide (0.1 mol), 73 g. of cyclopentylacetyl chloride (0.5 mol), and 10.2 g. of finely pulverized sodium formate (0.15 mol) were stirred for 1 hour at 70° C. The whole was then evaporated under reduced pressure at 70° C., the residue was extracted with 150 ml. of boiling ethyl acetate, undissolved sodium salt was removed by filtration while hot and the acylated sulfochloride was precipitated in crystalline form by means of 3-times the volume of petrol ether from the filtrate which had been decolourized with charcoal. Yield: 30.6 g. (74% of the theory); melting point: 85–86° C.

(b) The reaction of 20.7 g. of the intermediate product (0.05 mol) with ammonia in a manner analogous to that described in Example 1(b), yielded, after recrystallization from ethanol, 13.6 g. of disulfonamide (69% of the theory). Melting point: 95–96° C.

Further compounds of the general Formula I which were prepared in a manner analogous to that described in one of the foregoing examples are listed in the following table.

| Example No.: | R | R₁ | Prepared analogously to Example— | Melting point of the sulfochloride (general Formula IV), ° C. | Recrystallized from— | Melting point of the disulfonamide (general Formula I), ° C. | Recrystallized from— |
|---|---|---|---|---|---|---|---|
| 12 | CH₃ | C₆H₁₁ | 9 | 96–98 | Ethyl acetate/petrol ether. | 183–184 | Ethanol. |
| 13 | CH₃ | CH(CH₃)₂ | 9 | 124 | ...do... | 165–166 | Ethanol/H₂O. |
| 14 | CH₃ | C₄H₉—(n) | 9 | 98 | ...do... | 152–153 | Do. |
| 15 | CH₃ | CH₂—CH(CH₃)₂ | 9 | 122–123 | ...do... | 180–181 | Do. |
| 16 | CH₃ | C₅H₁₁—(n) | 9 | 104 | ...do... | 156–157 | Do. |
| 17 | CH₃ | C₇H₁₅—(n) | 11 | 96–98 | ...do... | 116–118 | Do. |
| 18 | CH₃ | CH₂C₆H₅ | 12 | 205–207 | ...do... | 86–88 | Do. |
| 19 | CH₃ | CH₂—CH₂—C₆H₅ | 12 | 132 | Ethyl acetate | 133 | Do. |

EXAMPLE 10

1-chloro-N⁴-methyl-N⁴-cinnamoyl-benzene-2,4-disulfonamide (a) 30.4 g. of 1-chloro-N-methyl-benzene-2-sulfochloride-4-sulfonamide (0.1 mol), 66.5 g. of cinnamic acid chloride (0.4 mol), and 10.2 g. of finely pulverized sodium formate (0.15 mol) were stirred for 1 hour at 70° C. The condensation product was then precipitated by the addition of 0.3 l. of petrol ether and it was purified by recrystallization from ethyl acetate. Yield: 33.6 g. (77% of the theory), melting point: 178–179° C.

(b) 21.8 g. of the intermediate product (0.05 mol) were reacted with ammonia in a mixture of tetrahydrofurane and dimethylformamide (10:1) in a manner analogous to that described in Example 1(b) and the final product was recrystallized from 90% ethanol. Yield: 11.6 g. (56% of the theory); melting point: 196–197° C.

EXAMPLE 11

1-chloro-N⁴-tetrahydrofurfuryl-N⁴-acetyl-benzene-2,4-disulfonamide 37.5 g. of 1 - chloro - N - tetrahydrofurfuryl - benzene-2-sulfochloride-4-sulfonamide (melting point 131° C.) were reacted in a manner analogous to that described in Example 1(a) with acetanhydride and the crude product was recrystallized from a mixture of ethyl acetate and petrol ether. Yield: 28.0 g. (67% of the theory); melting point: 121° C.

From 20.8 g. (0.05 mol) of the 1-chloro-N-tetrahydrofurfuryl - N - acetyl - benzene - 2 - sulfochloride - 4 - sulfonamide thus obtained, there was obtained the corresponding disulfonamide by the reaction with ammonia in a manner analogous to that described in Example 1(b). After recrystallization from a mixture of ethyl acetate and petrol ether, the yield was 14.5 g. (73% of the theory); melting point: 137–139° C.

We claim:
1. An N-acylated halobenzene-2,4-disulfonamide of the formula

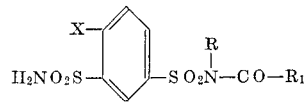

in which X is chlorine or bromine; R is methyl, ethyl or tetrahydrofurfuryl; and R₁ is alkyl of up to 8 carbon atoms, chloromethyl, bromomethyl, allyl, furyl, cyclopentylmethyl, phenyl, benzyl or phenylethyl.

2. A compound as defined in claim 1 wherein X is chlorine, R is methyl and R₁ is alkyl of up to eight carbon atoms.

3. A compound as claimed in claim 1 wherein X means chlorine and R and R₁ mean methyl.

4. A compound as claimed in claim 1, wherein X means chlorine, R means methyl and R₁ means propyl.

5. A compound as claimed in claim 1, wherein X means chlorine, R means methyl and R₁ means butyl.

6. A compound as claimed in claim 1, wherein X means chlorine, R means methyl and R₁ means cyclopentylmethyl.

7. A compound as claimed in claim 1, wherein X means chlorine, R means tetrahydrofurfuryl and R₁ means methyl.

References Cited

UNITED STATES PATENTS 2,236,168  8/1969  Dietrich _____ 260—556

FOREIGN PATENTS

Vogel: Practical Organic Chemistry, John Wiley, New York, N.Y. (1962), p. 554.

ALEX MAZEL, Primary Examiner

B. I. DENTZ, Assistant Examiner

U.S. Cl. X.R.

260—240, 333.2, 556; 424—275, 285, 321